US009154335B2

(12) United States Patent
Goikhman (10) Patent No.: US 9,154,335 B2
(45) Date of Patent: Oct. 6, 2015

(54) METHOD AND APPARATUS FOR TRANSMITTING DATA ON A NETWORK

(71) Applicant: Marvell Israel (M.I.S.L) Ltd., Yokneam (IL)

(72) Inventor: Shay Goikhman, Haifa (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 366 days.

(21) Appl. No.: 13/671,073

(22) Filed: Nov. 7, 2012

(65) Prior Publication Data

US 2013/0114960 A1    May 9, 2013

Related U.S. Application Data

(60) Provisional application No. 61/582,965, filed on Jan. 4, 2012, provisional application No. 61/557,512, filed on Nov. 9, 2011, provisional application No. 61/557,327, filed on Nov. 8, 2011.

(51) Int. Cl.
*H04L 12/54*     (2013.01)
*H04J 14/02*     (2006.01)
*H04L 12/64*     (2006.01)
*H04Q 11/00*     (2006.01)

(52) U.S. Cl.
CPC ........ *H04L 12/6418* (2013.01); *H04Q 11/0067* (2013.01); *H04Q 2011/0064* (2013.01)

(58) Field of Classification Search
CPC .................... H04Q 11/0067; H04Q 2011/0064
USPC ...................................... 398/66, 43; 370/412
See application file for complete search history.

(56) References Cited

U.S. PATENT DOCUMENTS

| | | | |
|---|---|---|---|
| 5,901,140 A * | 5/1999 | Van As et al. | 370/236 |
| 5,938,736 A * | 8/1999 | Muller et al. | 709/243 |
| 6,430,527 B1 * | 8/2002 | Waters et al. | 703/3 |
| 6,678,269 B1 * | 1/2004 | Michels et al. | 370/389 |
| 7,219,184 B2 * | 5/2007 | Stojancic | 711/5 |
| 8,200,686 B2 * | 6/2012 | Rhoades | 707/764 |
| 8,880,507 B2 * | 11/2014 | Kotha et al. | 707/715 |
| 2002/0023080 A1 * | 2/2002 | Uga et al. | 707/1 |
| 2002/0109876 A1 * | 8/2002 | Eijk et al. | 359/110 |
| 2002/0129189 A1 * | 9/2002 | Lin et al. | 711/1 |
| 2003/0208475 A1 * | 11/2003 | Andreev et al. | 707/3 |
| 2004/0139091 A1 * | 7/2004 | Shin | 707/100 |

(Continued)

OTHER PUBLICATIONS

Tarek, A.: "A New Approach for Multiple Element Binary Search in Database Applications," International Journal of Computers, Issue 4, vol. 1, 2007 (pp. 269-279).

*Primary Examiner* — Oommen Jacob (57) ABSTRACT

Systems and methods are provided for a network unit for transmitting packets on a network that includes a computer-readable medium encoded with an array data structure that is populated by plurality of entries, each entry corresponding to a packet in a queue of packets to be transmitted, a particular entry including a value that is based on a sum of packet sizes stored in a neighboring entry and a packet size of a packet corresponding to the particular entry. A search engine is configured to receive a gate size and to search the array to identify a particular entry in the data structure that has a value nearest to but not greater than the gate size as a transmission entry. A transmission engine is configured to transmit packets from the beginning of the queue up to a particular packet associated with the transmission entry.

17 Claims, 9 Drawing Sheets

(56) References Cited

U.S. PATENT DOCUMENTS

| | | | |
|---|---|---|---|
| 2004/0139107 A1* | 7/2004 | Bachman et al. | 707/104.1 |
| 2005/0004908 A1* | 1/2005 | Ben-Haim et al. | 707/4 |
| 2007/0005502 A1* | 1/2007 | Ohno et al. | 705/57 |
| 2007/0160052 A1* | 7/2007 | Okada | 370/392 |
| 2007/0286194 A1* | 12/2007 | Shavitt et al. | 370/392 |
| 2008/0260008 A1* | 10/2008 | Vrcelj et al. | 375/149 |
| 2012/0110411 A1* | 5/2012 | Cheung et al. | 714/758 |
| 2012/0206951 A1* | 8/2012 | Rachamadugu et al. | 365/49.17 |
| 2012/0262314 A1* | 10/2012 | Carlson | 341/87 |
| 2013/0114960 A1* | 5/2013 | Goikhman | 398/66 |

* cited by examiner

```
void bin_search_mult(int s, int e, int key[], int res[], int len,)
{
 int mid, i=0;
 int indx;

if (s==e || s+1==e)
  {
    Set res[i] to e;
    return;
  }
 mid = (s+e)/2;
 indx = 0;

if (array[mid] > key[indx] )
 {
  i = indx+1;

while (array[mid] > key[indx]  && i<len) i++;
    if ( indx+1 == i ){  /* ordinary search */
        res[indx]= bin_search(s,mid,key[indx]);
    }
    else {
        bin_search_mult(s, mid, &key[indx], &res[indx], i-indx);
        if (i == len )
          return;
    }
 } indx = i;
 if (array[mid] < key[indx])
  {
     len-= indx;
     if (len == 1){
        res[indx] = bin_search(mid,e, key[indx]);
        return;
      }
    bin_search_mult(mid, e, &key[indx], &res[indx], len);
    return;
  } res[indx++] = mid;
 bin_search_mult(mid+1, e, val, res, len--);

… # METHOD AND APPARATUS FOR TRANSMITTING DATA ON A NETWORK

CROSS-REFERENCE TO RELATED APPLICATIONS

This application claims priority to U.S. Provisional Patent Application No. 61/557,327, filed Nov. 8, 2011, entitled "Multiple Key Binary Search," U.S. Provisional Patent Application No. 61/557,512, filed Nov. 9, 2011, entitled "EPON Report Generation in O(log Q.len)Time," and U.S. Provisional Patent Application No. 61/582,965, filed Jan. 4, 2012, entitled "EPON Report Generation in O(log Q.len) Time" each of which are herein incorporated in their entirety.

FIELD

The technology described herein relates generally to network data transmission and more particularly to bandwidth allocation requests and management.

BACKGROUND

In certain network configurations, bandwidth is requested by a network unit from a central network controller that grants bandwidth to multiple network units associated with that controller. When a particular network unit receives a message from the central network controller that states that the particular network unit has been granted an amount of bandwidth on which to transmit data, the particular network unit needs to perform certain operations and calculations in a limited amount of available time.

The description above is presented as a general overview of related art in this field and should not be construed as an admission that any of the information it contains constitutes prior art against the present patent application.

SUMMARY

Examples of systems and methods are provided for a network unit for transmitting packets on a network that includes a computer-readable medium encoded with an array data structure that is populated by plurality of entries, each entry corresponding to a packet in a queue of packets to be transmitted, a particular entry including a value that is based on a sum of packet sizes stored in a neighboring entry and a packet size of a packet corresponding to the particular entry. A search engine is configured to receive a gate size, the search engine being configured to search the array to identify a particular entry in the data structure that has a value nearest to but not greater than the gate size as a transmission entry. A transmission engine is configured to transmit packets from the beginning of the queue up to a particular packet associated with the transmission entry.

As another example, a computer-implemented method of transmitting data based on a received gate size includes generating an array data structure that is populated by a plurality of entries on a non-transitory computer-readable medium, where each entry corresponds to a packet in a queue of packets to be transmitted, where the entries are ordered according to an order of the packets in the queue, and where a particular entry includes a value that is based on a sum of packet sizes stored in a neighboring entry and a packet size of a packet corresponding to the particular entry. The array is searched to identify a transmission entry having a value nearest to but not greater than the gate size, and packets are transmitted from the queue up to a particular packet associated with the transmission entry.

DETAILED DESCRIPTION

Figure 1:
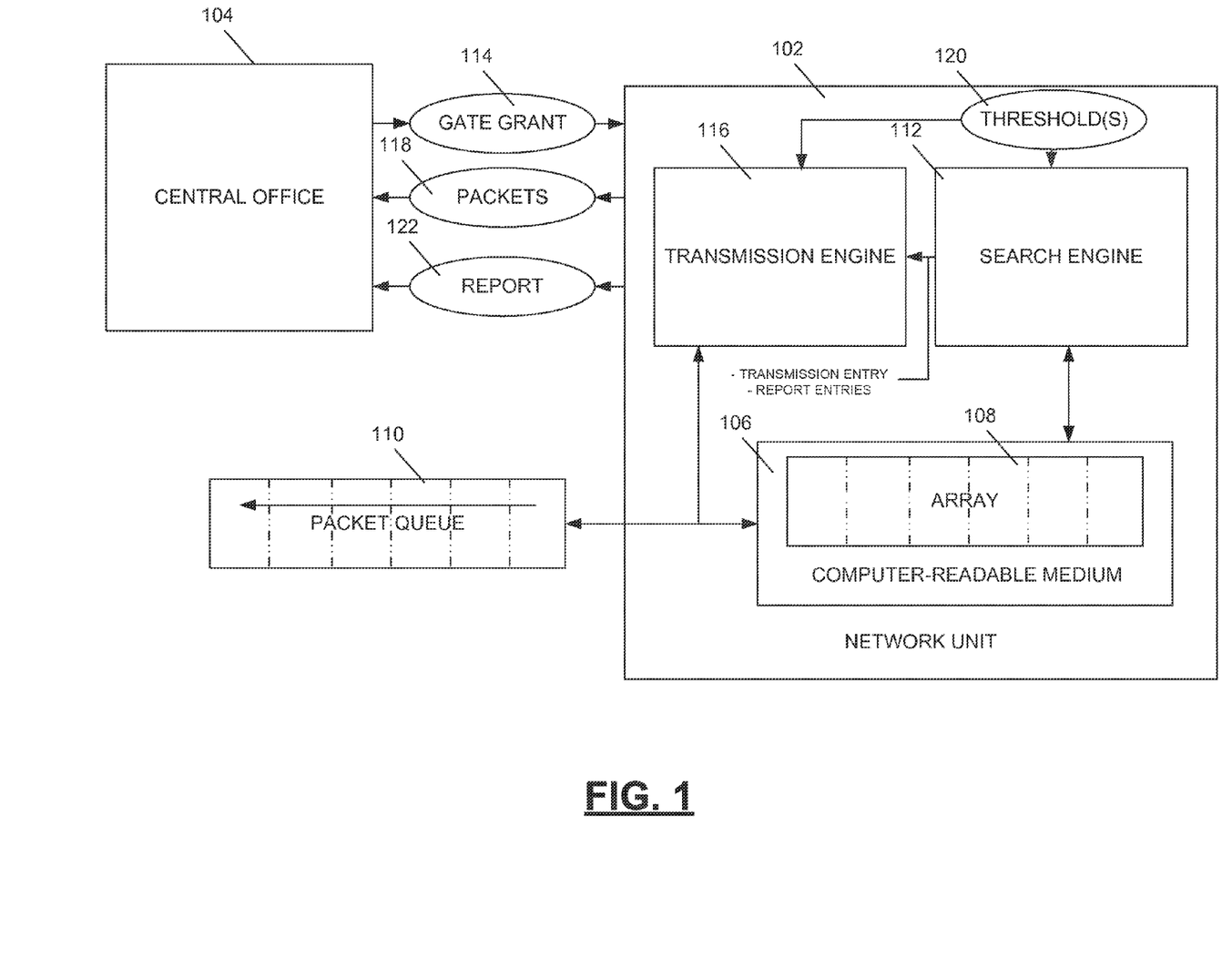
FIG. 1 is a block diagram depicting a network unit for transmitting packets on a network in accordance with an embodiment of the disclosure.

FIG. 1 is a block diagram depicting a network unit for transmitting packets on a network in accordance with an embodiment of the disclosure. A network unit 102 for transmitting packets on a network, such as to and from a central office 104, includes a computer readable medium 106 encoded with an array data structure 108 that is populated by a plurality of entries. Each entry in the e array data structure 108 corresponds to a packet in a queue 110 of packets to be transmitted. The entries in the array data structure 108 are ordered according to an order of packets in the queue 110. A particular entry in the array data structure 108 includes a value that is based on a sum of packet sizes stored in a neighboring entry and a packet size of a packet corresponding to the particular entry in the array data structure 108.

The network unit 102 further includes a search engine 112 that is configured to receive a gate size as part of a gate grant message 114 from the central office 104. The gate size represents an amount of bandwidth granted to the network unit 102 by the central office 104. The search engine 112 is configured to search the array 108 to identify a particular entry in the array data structure 108 that has a value nearest to but not greater than the gate size as a transmission entry in the array data structure 108.

The network unit 102 also includes a transmission engine 116. The transmission engine 106 is configured to identify a particular packet in the packet queue 110 that is associated with the transmission entry in the array data structure 108. The transmission engine 116 is further configured to transmit packets 118 from the beginning of the packet queue 110 up to the particular packet in the packet queue 110.

In addition to transmitting packets 118 in response to a bandwidth grant from the central office 104, in an embodiment of the disclosure, the network unit 102 performs reporting functionality that facilitates requesting additional bandwidth within which to send additional packets from the packet queue 110. For example, the search engine 112 may receive a threshold value 120 indicative of a possible future approximate bandwidth grant. The network unit 102 determines an amount of bandwidth to request corresponding to a size of whole packets that can be sent from the packet queue 110 that is nearest to but not greater in size than the threshold value 120. The network unit 102 is configured to use the search engine 112 to identify a second particular entry in the array data structure 108 that has a value nearest to but not greater than the gate size plus the threshold value 120 as a report entry. The transmission engine 116 is configured to transmit a report 122 based on the identified report entry in the array data structure 108.

Figure 2:
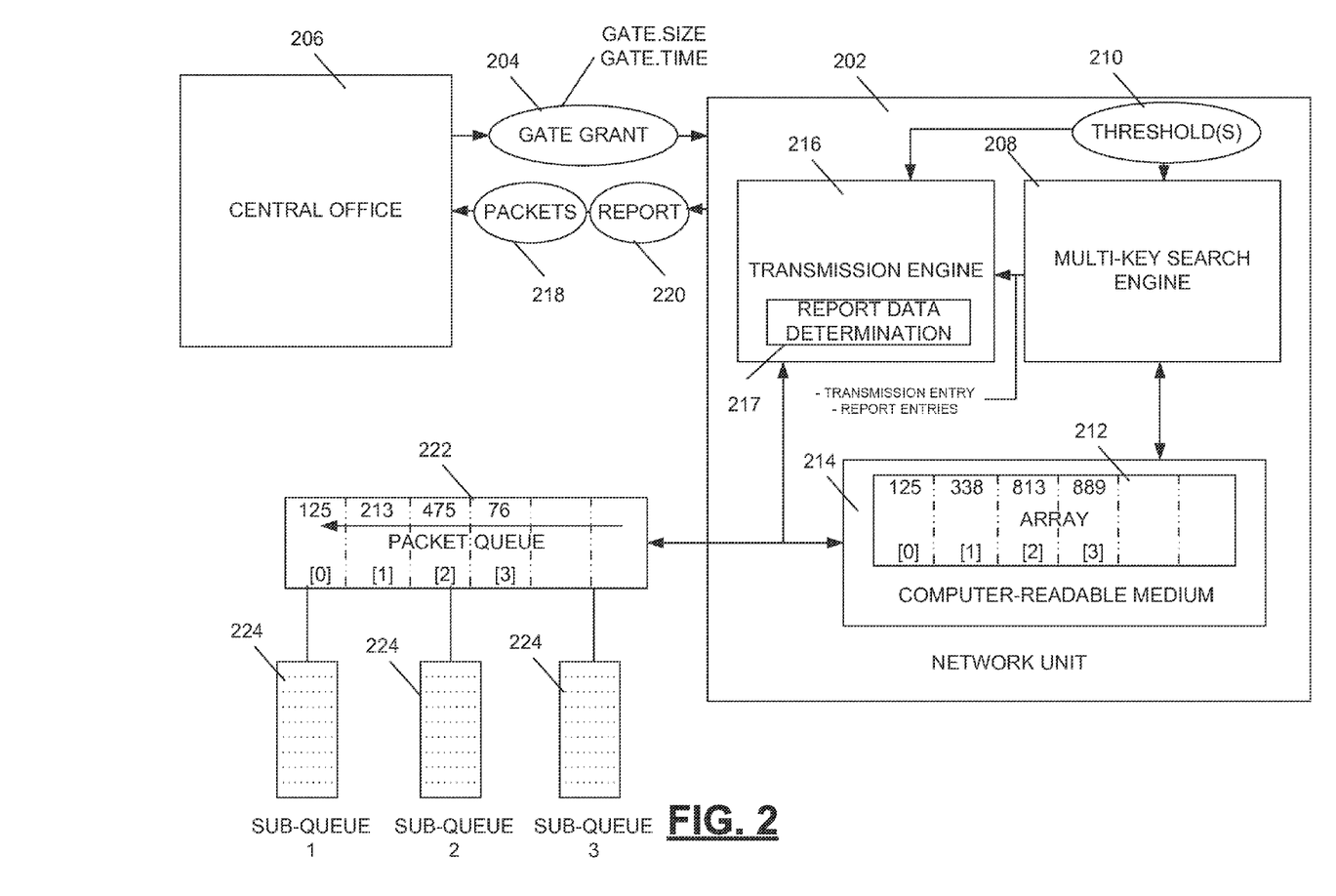
FIG. 2 is a block diagram depicting example operations of a network unit in an embodiment of the disclosure.

FIG. 2 is a block diagram depicting example operations of a network unit in an embodiment of the disclosure. A network unit 202 receives a gate grant 204 from a central office 206 that indicates a gate size. The gate size represents an amount of bandwidth, such as a number of bits or bytes, allocated to the network unit 202 for transmission in an upcoming period of time or transmission gate. Such a grant, in an embodiment, is based on a previous bandwidth request made by the network unit 202, and is supplied to the central office 206 in the form of a prior report, such as a prior report appended to a previous data transmission.

As seen in the FIG. 2 example, a search engine 208 is provided the gate size and one or more thresholds values 210 that are received by the network unit 202. The one or more thresholds values 210 may be received from the central office 206, such as in the gate grant 204, or the one or more thresholds values 210 may be predetermined values known to the network unit 210. For example, the one or more threshold values 210 are predetermined approximate grant block sizes that the central office 206 is likely to grant, in an embodiment. The multi-key search engine 208 is configured, in an embodiment, to perform a multi-key search an array data structure 212 stored on a computer-readable storage medium 214 for entries corresponding to the gate size and to each of the one or more threshold values 210. In an embodiment, multiple entries are searched in a single search operation. With respect to the gate size, the search engine 208 is configured, in an embodiment, to identify a transmission entry that corresponds with a last packet in the queue that can be sent in a current transmission while remaining at or under the number of bytes allocated to the network unit 202, as identified in the gate size. With respect to a particular one of the threshold values 210, the search engine is configured to identify a particular report entry in the array data structure 212 that corresponds with the last packet in the queue that could be sent in a subsequent transmission if the central office 206 were to allocate a grant size equal to the particular threshold value 210. The multi-key search engine 208 is configured to identify a report entry for each of the one or more threshold values 210.

Upon identification of the transmission entry and the one or more report entries, the transmission engine 216 is configured to prepare and send packets 218 and to further send report data 220, which is sent after or appended to the end of the data packets 220, to the central office 206, in an embodiment. The transmission engine 216 accesses the packet queue 222 and transmits packets 218 from the front of the packet queue 222 up to the packet associated with the transmission entry in the array data structure 212.

The packet queue 222 may contain a number of packets [0], [1], [2], and [3] that a computing machine (e.g., a desktop computer, a laptop computer, a server, a 3G or 4G wireless device) desires to transmit. In a multi-tasking computer environment, the packets may be added to the packet queue 222 by individual applications running on the computing machine that wish to transmit data to outside network locations through the central office 206. Each of the applications may be associated with a sub-queue 224. When an application adds one or more packets to its sub-queue 224, the sub-queue 224 forwards those packets to the packet queue 222 for the computing system for transmission to the central office 206. Upon addition of a packet to the packet queue 222 from a packet sub-queue 224, an entry is added to the array data structure 212, and a value is set in the added entry based on a size of the packet added to the packet queue 222.

The transmission engine 216 further calculates and transmits report data 220 for each of the one or more thresholds 210, as indicated at 217. For example, for the particular threshold value, the search engine 208 has previously identified a particular report entry in the array data structure 212. The report particular report entry is provided to the transmission engine by the search engine 208. The transmission engine 216 determines a number of bytes present in packets in the packet queue 222 that are associated with entries subsequent to the transmission entry up to, and including, the particular report entry (e.g., the particular report entry value minus the transmission entry value). That number is transmitted to the central office 206 as report data for the particular threshold, representing a bandwidth request amount. Bandwidth request amounts are transmitted as report data 220 for each of the one or more threshold values.

The network unit 202 typically has a limited period of time, in an embodiment, during which to prepare and transmit the packets 218 and report data 220 from the time a gate grant 204 is received. For example, in one embodiment of the disclosure, the gate grant 204 includes a gate size and further includes a gate time. The gate time indicates the timing associated with the allocation of bytes identified by the gate size and further indicates when the network unit 202 is to begin transmission of packets 218 that aggregate in size up to but not over the gate size. This arrangement provides the network unit 202 a period of time from receipt of the gate grant to the time identified by the gate time in which to prepare the packets for transmission (i.e., to identify which packets from the packet queue 222 are to be transmitted and to prepare the report data 220 for the one or more thresholds 210) and to determine report data for subsequent bandwidth requests. The period of time is quite short (i.e., a number of milliseconds), in an embodiment.

A network unit 202, in an embodiment, implements various procedures and data structures to process packets for transmission and to report data in an efficient manner on as to conform to the time period constraints imposed by the gate time parameter. The array data structure 212 depicted in FIG. 2 is a suitable data structure. The array data structure 212 includes a number of entries, where each of those entries corresponds to a packet in the packet queue 222. In the example of FIG. 2, both the packet queue 222 and the array data structure 212 are capable of holding six entities, while other embodiments may be configured to handle much larger numbers of entities. In the example of FIG. 2, the packet queue 222 includes four packets [0], [1], [2], and [3] for transmission, and the array data structure 212 has four corresponding array entries that contain data, [0], [1], [2], and [3]. The first packet in the packet queue 222 is 125 bytes in length, the second packet is 213 bytes in length, the third packet is 475 bytes in length, and the fourth packet is 76 bytes in length. Each array data structure elements is configured to contain data corresponding to cumulative totals of packet sizes from the front of the packet queue 222 to the packet associated with that array data structure element. Thus, the first array data structure element [0] contains a value of 125, which corresponds to the number of bytes in packet queue packet [0]. The second array data structure element [1] contains a value of 338, which corresponds to the number of bytes in packet queue packet [0] plus the number of bytes in packet queue packet [1] (i.e., 125 bytes plus 213 bytes). The third array data structure element [2] contains a value of 813, which corresponds to the number of bytes in packet queue packets [0] and [1] plus the number of bytes in packet queue packet [2] (i.e., 338 bytes plus 475 bytes). The fourth array data structure element [3] contains a value of 889, which corresponds to the number of bytes in packet queue packets [0], [1], and [2] plus the number of bytes in packet queue packet [3] (i.e., 813 bytes plus 76 bytes). Thus, each entry in the array data structure is based on a sum of packet sizes of packets associated with preceding entries in the array data structure plus a packet size of a packet corresponding to that entry.

The array data structure 212 format depicted in FIG. 2 provides time e savings, in an embodiment, in identifying a transmission entry and report entries in the array data structure 212 for use in preparing the packets 218 and report data 220 for transmission to the central office 206. By maintaining the cumulative size counts depicted in the array data structure 212, such size counts do not need to be calculated on-the-fly by accessing the packet queue 222 in the often short time period between receipt of a gate grant 204 and the gate time identified in the gate grant. The transmission entry in the array data structure 212 is quickly identified as the array data structure element having a value nearest to but not greater than the grant size identified in the gate grant 204. The transmission engine 216 then transmits packets 218 from the packet queue 222 from the beginning of the packet queue 222 up to the packet that corresponds to the transmission entry identified in the array data structure 212.

The array data structure format of FIG. 2 also can speed identification of report entries in the array data structure that are used to determine report data 220. A report for a threshold value seeks to report to the central office 206 how many bytes from whole packets can be transmitted from the front of the packet queue 222 in a subsequent transmission cycle (i.e., after the current gate grant packets 218 are transmitted) in a grouping that is smaller than or equal to in size as the threshold value. In an embodiment, the search engine 208 determines a report value for a particular threshold value in the report 220 by searching the array data structure 212 for an entry value that is closest to but not greater than the gate size plus the particular threshold value. The array data structure entry associated with that entry value is identified as the report entry for that particular threshold value. A report value for the particular threshold value is then computed by subtracting the transmission entry value from the value in the report entry associated with the particular threshold value. Report values are similarly determined for each of the one or more threshold values 210.

A network unit 202 performs other optimizations to improve packet 218 transmission and report 220 generation performance, in an embodiment. For example, the search engine 208 utilizes a binary search to identify transmission entries and report entries in the array data structure 212. Using a binary search improves searching from an O(n) operation to an O(log(n)) operation. In one embodiment of the disclosure, the search engine 208 is a multi-key search engine that is configured to search the array data structure 212 for multiple entries (e.g., a transmission entry and one or more report entries) at the same time, which can further shorten search durations. Details of an example multi-key search are described in further detail below.

Figure 3:
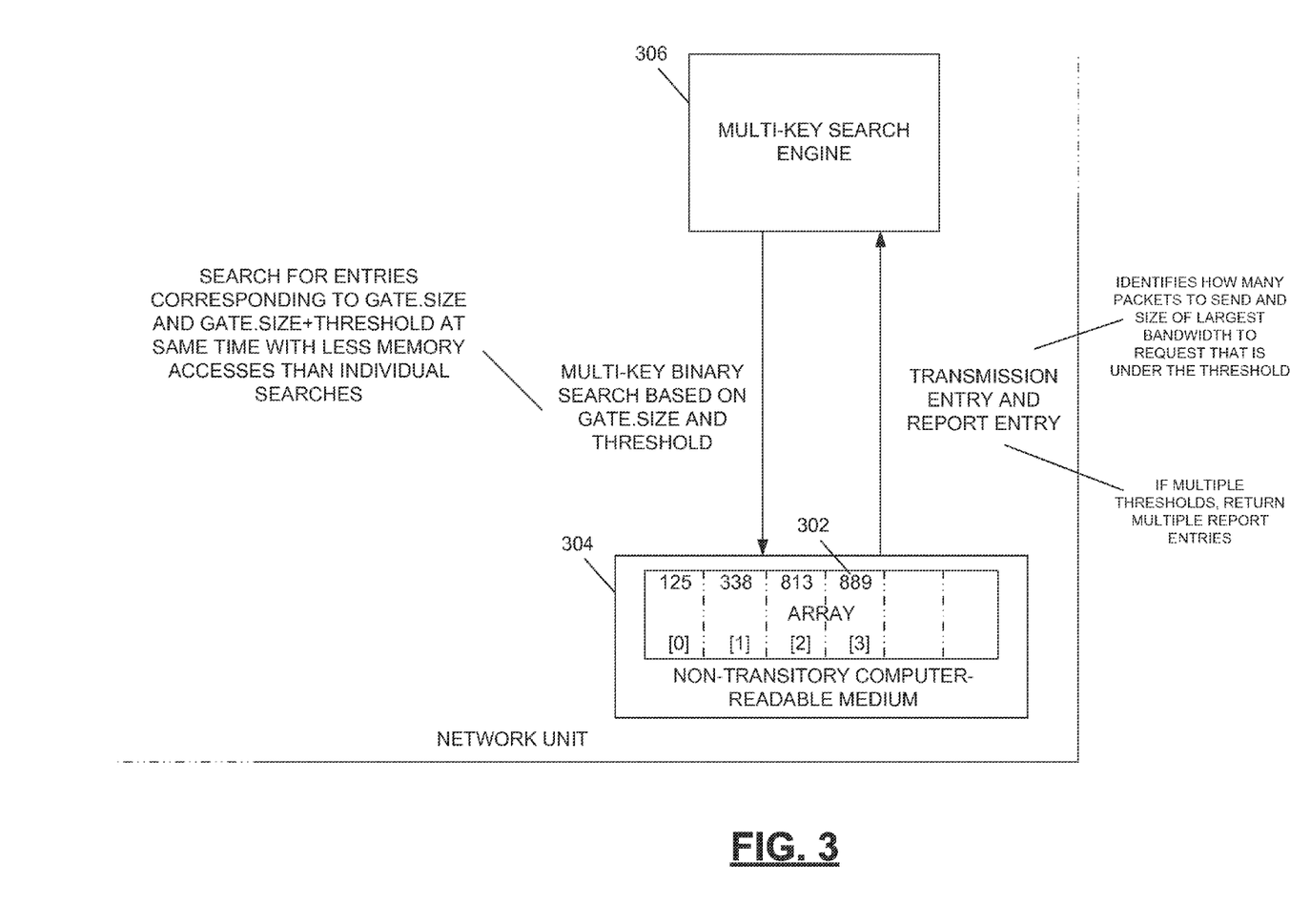
FIG. 3 is a diagram depicting an example interaction between a multi-key search engine and an array data structure in accordance with one embodiment of the disclosure.

FIG. 3 is a diagram depicting an example interaction between a multi-key search engine and an array data structure in accordance with one embodiment of the disclosure. The array data structure 302 is encoded on a computer-readable medium 304 such as a random access memory, cache memory, or hard drive storage. The array data structure 302 is populated by a plurality of entries. In the example of FIG. 3, the array data structure 302 contains six entries, four of which contain data values. Each entry that has a data value in the array data structure 302 corresponds to a packet in a queue of packets to be transmitted. The entries in the array data structure 302 are ordered according to an order of the corresponding packets in the packet queue. A particular entry, the entry labeled [2], includes a value 813 that is based on a sum of packet sizes 338 that is stored in a neighboring entry and a packet size 475 of a packet corresponding to the particular entry [2].

The multi-key search engine 306 interacts with the array data structure 302 to identify a transmission entry and a report entry for each of one or more threshold values. In the example of FIG. 3, the multi-key search engine receives a single threshold value and, thus, is searching for a transmission entry and a single report entry in the array data structure 302. In the example of FIG. 3, the multi-key search engine searches for both the transmission entry and the single report entry in a single multi-key search procedure. Such a procedure can reduce the number of accesses to memory 304 necessary to locate the transmission entry and the single report entry. In an embodiment, the transmission entry sought by the multi-key search engine 306 is the entry in the array data structure 302 that contains a value closest to but not greater than the gate size. The single report entry sought by the multi-key search engine 306 is the entry in the array data structure 302 that contains a value closest to but not greater than the gate size plus the single threshold value.

Figure 4:
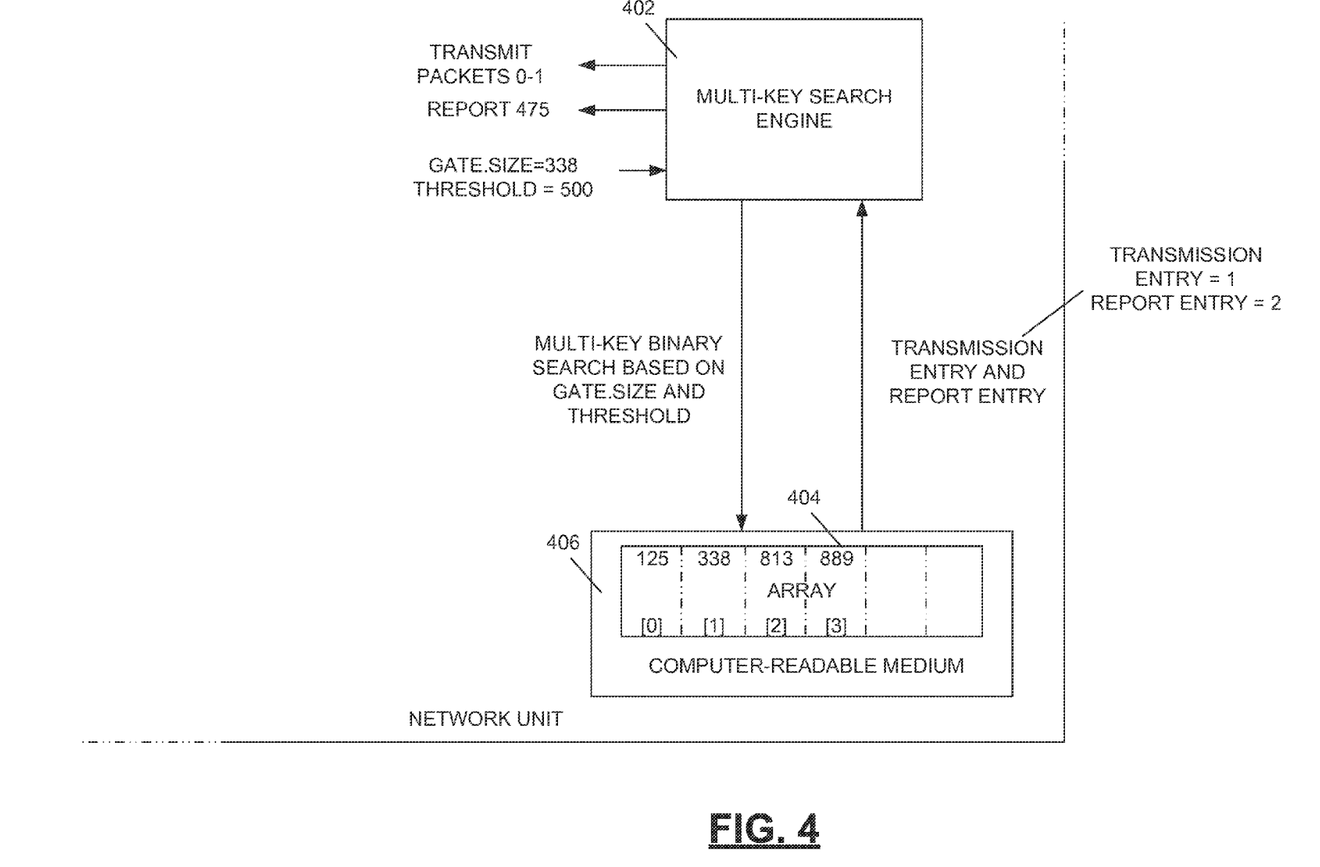
FIG. 4 is a diagram depicting additional example interactions between a multi-key search engine and an array data structure in accordance with one embodiment of the disclosure.

FIG. 4 is a diagram depicting additional example interactions between a multi-key search engine and an array data structure in accordance with an embodiment of the disclosure. The multi-key search engine 402 receives a gate size of 338 and a threshold value of 500. The multi-key search engine 402 accesses the array data structure 404 stored on the computer-readable medium 406 to identify a transmission entry and a report entry in the array data structure 404 using a multi-key search. The multi-key search engine 402 performs a multi-key binary search in stages. In the first stage, the multi-key search engine 402 divides the populated entries in the array data structure 404 (i.e., entries [0], [1], [2], [3]) into two evenly sized groups (i.e., a first group containing entries [0] and [1] and a second group containing entries [2] and [3]). The multi-key search engine 402 then determines which of the two halves of the array data structure 404 the gate size and the threshold value plus gate size fall into by determining whether the gate size and the threshold value plus gate size are less than the first array entry value in the upper half being considered 813. The multi-key search engine 402 determines that the gate size 338 is in the bottom half and that the gate size plus threshold value 838 is in the top half. Because the gate size and the gate size plus threshold value are in separate halves, the multi-key search engine 402 proceeds to seek the transmission entry and the report entry using individual, single-key binary searches. When more than one key being sought is in the same half, the multi-key search engine 402 can continue searching for those keys using the multi-key protocol described above, as described in further detail with respect to FIG. 6.

Proceeding in the single-key protocol for the gate size, which has been determined to be in the bottom half, the multi-key search engine 402 divides the bottom half (i.e., entries [0] and [1]) into two halves. The multi-key search engine 402 determines whether the gate size is in the bottom half that contains entry [0] or the top half that contains entry [1] by determining whether the gate size 338 is less than the first entry in the top half 338. Because the gate size 338 is not less than the first entry in the top half 338, the gate size is determined to be in the top half containing entry [1]. Because that half contains only a single array entry, that single array entry is deemed to be the transmission entry. Similarly, the multi-key search engine 402 determines whether the gate size plus threshold value 838 is in the bottom half of the top half (containing entries [2] and [3]) that contains entry [2] or the top half that contains entry [3] by determining whether the gate size plus threshold value 838 is less than the first entry in the top half 889. Because the gate size plus threshold value 838 is less than the first entry in the top half 889, the gate size plus threshold is determined to be in the bottom half containing entry [2]. Because that half contains only a single array entry, that single array entry [2] is deemed to be the report entry.

Having determined the transmission entry as entry [1] and the report entry as entry [2], the multi-key search engine 402 can provide information to a transmission engine that instructs that packets up to the packet associated with the transmission entry, packets [0] and [1], should be transmitted to comply with the received gate size of 338 bytes, and the report data should include a value of 475 (i.e., the report entry value 813 minus the transmission entry value 338).

Figure 5:
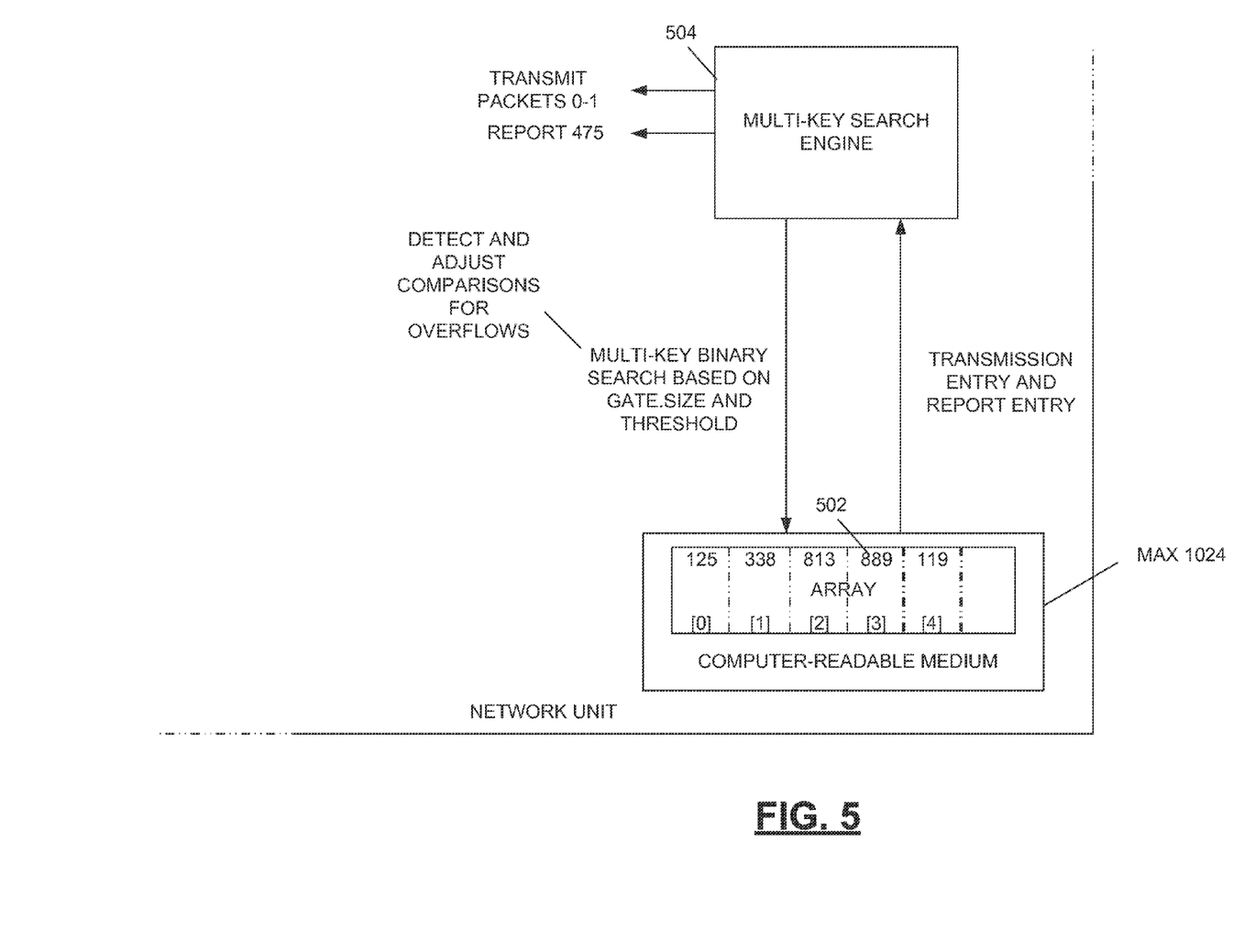
FIG. 5 is a diagram depicting handling of an overflow condition in the array data structure in an embodiment of the disclosure.

FIG. 5 is a diagram depicting handling of an overflow condition in the array data structure in an embodiment of the disclosure. The data type used to store values in the array data structure 502 is limited to a maximum value of 1024. When a fifth packet is added to the packet queue having a size of 254 bytes, array data structure entry [5] is attempted to be populated with a cumulative total of all packets in the queue of 1143. However, because the maximum value for an entry in the array data structure is 1024, the value in entry [5] overflows to 119. Such an overflow could adversely affect a single-key or multi-key binary search attempted on the array data structure 502 by the multi-key search engine 504. The multi-key search engine 504 may be configured to properly perform a search on an array having a single overflow in an embodiment of the disclosure. In such an embodiment, the multi-key search engine 504 expects that each entry in the array data structure 502 contains a value greater than the value in the preceding entry. By identifying a first entry in the array data structure 502 that contains a value that is not greater than its predecessor entry, the multi-key data structure can augment any comparisons that use that first entry or subsequent entries by adding the maximum value 1024 to the values contained in those overflowed entries. As long as the array data structure contains only a single overflow, such a procedure will ensure proper search comparisons. To take advantage of this overflow handling, an array data structure can be designed considering the maximum length of all packets in the packet queue. By selecting a maximum value for array entry values at half of that maximum length, the multi-key search engine can properly function regardless of the state of the packet queue.

Additional data structure techniques may be used to achieve high performance of the array data structure 502 and the multi-key search engine. For example, in one embodiment, the physical first entry in the array data structure does not necessarily need to correspond to the first packet in the packet queue. A head pointer or other data structure (e.g., an index value) can be used to identify the entry in the array data structure 502 that is corresponds with the first packet in the packet queue (the logical first entry). When packets are transmitted from the packet queue, entries in the array data structure 502 corresponding to the transmitted packets are cleared, subsequent entries are updated to reflect proper cumulative packet size totals after transmission of the packets, and the head pointer is moved to the new logical first entry in the array data structure 502. Such a configuration avoids data read and data write accesses to move entries forward in the array data structure 502 at every packet transmission. A packet queue can be similarly structured.

In one embodiment of the disclosure, the array data structure 502 is formed using a circular linked list, where each entry in the array data structure 502 includes a value and a pointer to a next entry in the array data structure 502. A pointer at the physical last entry in the array data structure 502 points to the physical first entry in the array data structure 502. In such an embodiment, as the identified logical first entry in the array data structure 502 moves back in the array data structure, vacated entries at the physical front of the array data structure can be populated as additional packets are added to the packet queue. A packet queue can be similarly structured.

Figure 6:
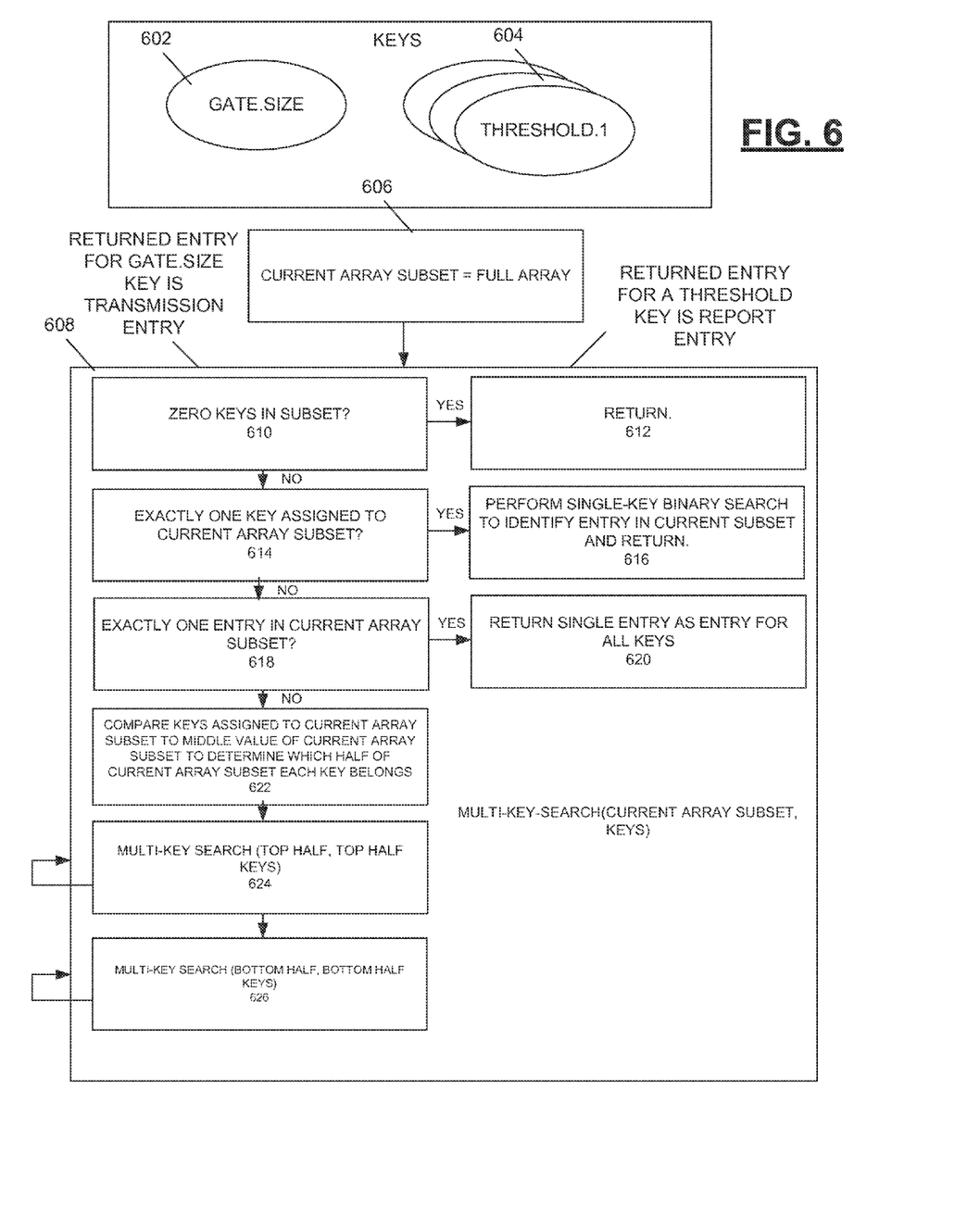
FIG. 6 is a diagram depicting an algorithm for performing a multi-key search in an embodiment of the disclosure.
Figure 7:
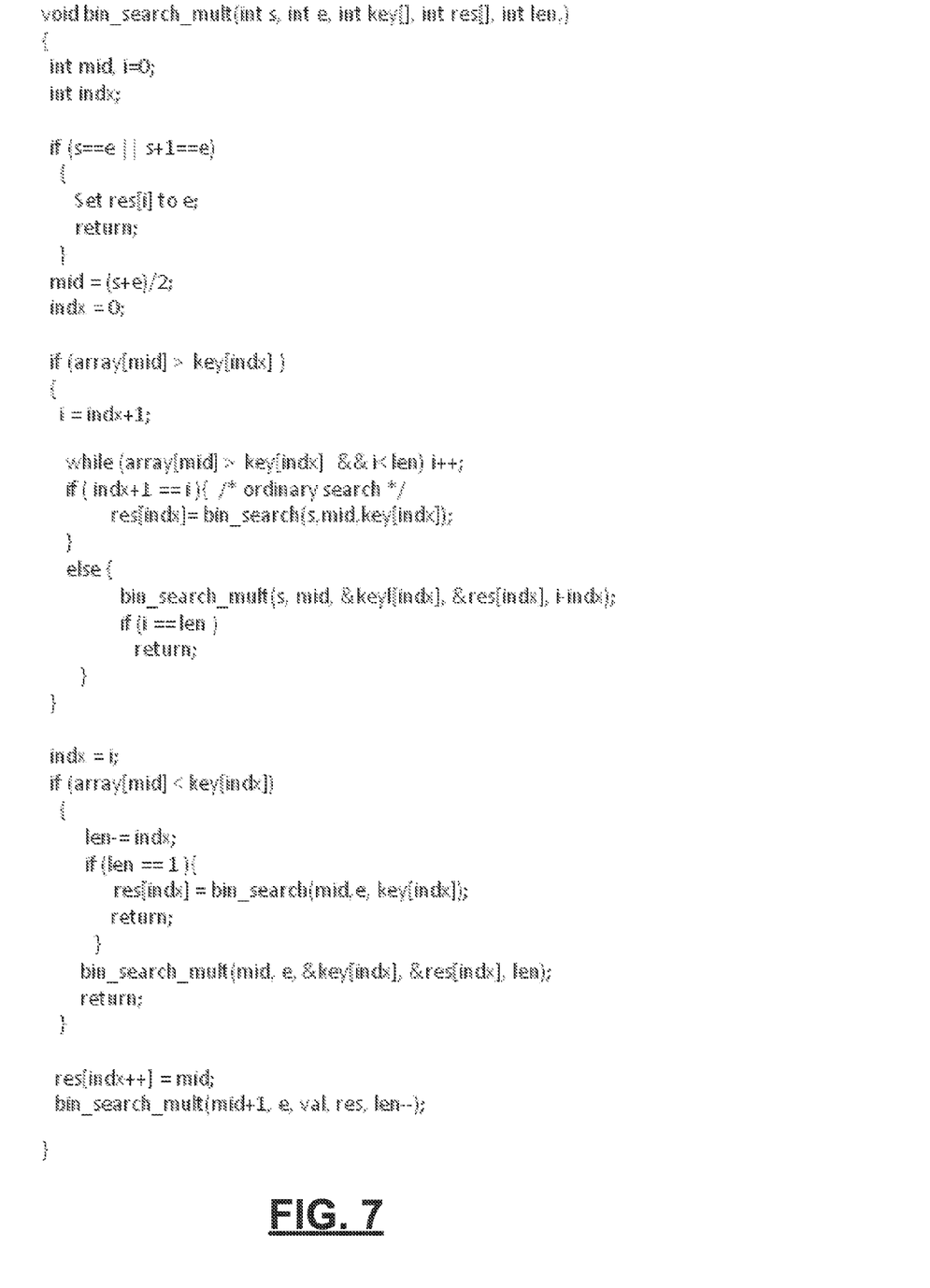
FIG. 7 depicts example code in the C programming language for implementing a multi-key search in an embodiment of the disclosure.

FIG. 6 is a diagram depicting an algorithm for performing a multi-key search in an embodiment of the disclosure. In the example of FIG. 6, the multi-key search engine operates to locate a transmission entry based on a gate size 602 and to locate a report entry for each of a plurality of threshold values 604. At 606, the current array subset is set as the full span of array entries having values. A multi-key search procedure 608 is called, with the current array subset (the full array) and the keys (the gate size 602 and the multiple threshold values 604) as arguments. At 610, the procedure determines if there are zero keys in the subset, meaning that no keys are provided as arguments in the procedure call. If there are zero keys, then the procedure returns at 610. If there is at least one key in the procedure call, then the procedure continues at 614 to determine if there is exactly one key present in the arguments. If there is exactly one key present in the arguments, then a single-key binary search is performed at 616 to find an array entry in the current subset for the single key. If multiple keys are presented as arguments, a check is performed at 618 to determine whether exactly one entry is in the current array subset provided as an argument to the multi-key search procedure call. If exactly one entry is present in the subset, then that single entry is returned for each of the keys presented as arguments at 620. If multiple keys and multiple entries are presented as arguments to the procedure call, a comparison is made at 622 of each of the keys assigned to the current array subset to a middle value (e.g., the first value of the upper half of the current array subset) of the current array subset to see whether each of the keys belongs in the top half of the current array subset or the bottom half of the current array subset. At 624, the multi-key search procedure 608 is recursively called for the top half entries of the current array subset and the key's determined to belong in the top half. At 626, the multi-key search procedure 608 is recursively called for the bottom half entries of the current array subset and the keys determined to belong in the bottom half. FIG. 7 depicts example C code for implementing a multi-key search in an embodiment of the disclosure.

A network unit as described in certain of the embodiments above may be utilized in a variety of systems. For example, in a system operating in an Ethernet Passive Optical Network (EPON) environment, bandwidth allocation is performed using a dynamic bandwidth allocation (DBA) protocol, where report and gate messages are interchanged between an optical line terminal (OLT) (e.g., a server at a central office) and an optical network unit (ONU) (e.g., a computer or a router in a home network of a subscriber). In an EPON system a gate message specifies the available bandwidth and a time slot allocated to an ONU at this allocation cycle. The ONU is configured to transmit its data and a fixed-size report message containing report data for one or more downstream bandwidth requests (e.g., one request for each of one or more threshold values).

Figure 8:
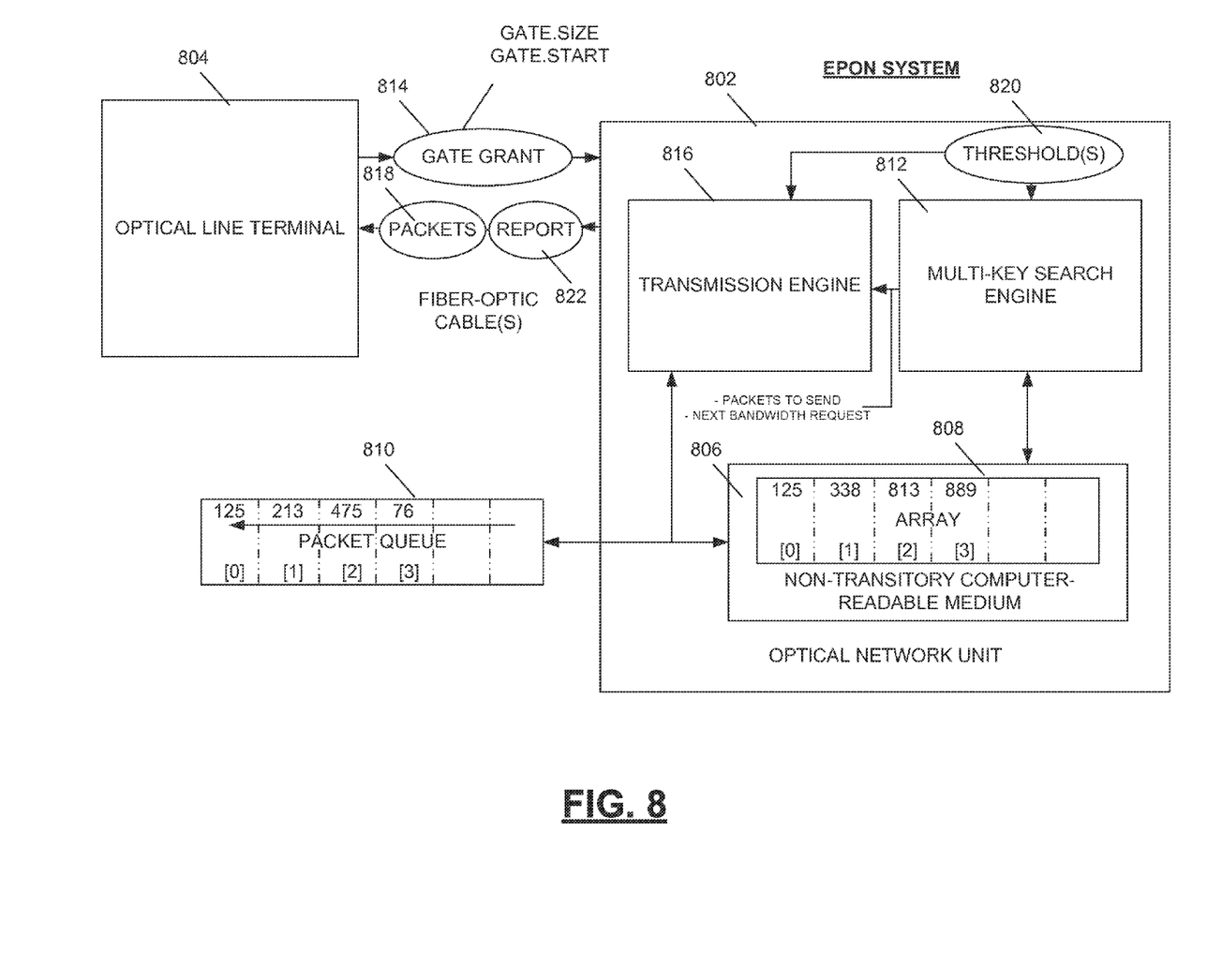
FIG. 8 is a block diagram depicting an optical network unit configured for transmitting packets on a network in an EPON system in accordance with an embodiment of the disclosure.

FIG. 8 is a block diagram depicting an optical network unit configured for transmitting packets on a network in an EPON system in accordance with an embodiment of the disclosure. An optical network unit 802 for transmitting packets on a network, such as to and from an optical line terminal 804, includes a computer readable medium 806 encoded with an array data structure 808 that is populated by a plurality of entries. Each entry in the array data structure 808 corresponds to a packet in a queue 810 of packets to be transmitted. The entries in the array data structure 808 are ordered according to an order of packets in the queue 810. A particular entry in the array data structure 808 includes a value that is based on a sum of packet sizes stored in a neighboring entry and a packet size of a packet corresponding to the particular entry in the array data structure 808.

The optical network unit 802 further includes a multi-key search engine 812 that is configured to receive a gate size as part of a gate grant message 814 from the optical line terminal 804. The gate size represents an amount of bandwidth granted to the optical network unit 802 by the optical line terminal 804. The search engine 812 is configured to search the array 808 to identify a particular entry in the array data structure 808 that has a value nearest to but not greater than the gate size as a transmission entry hr the array data structure 808.

The optical network unit 802 also includes a transmission engine 816. The transmission engine 806 is configured to identify a particular packet in the packet queue 810 that is associated with the transmission entry in the array data structure 808. The transmission engine is further configured to transmit packets 818 from the beginning of the packet queue 810 up to the particular packet in the packet queue 810.

In addition to transmitting packets 818 in response to a bandwidth grant from the optical line terminal 804, in an embodiment of the disclosure, the optical network unit 802 performs reporting functionality that facilitates requesting additional bandwidth within which to send additional packets from the packet queue 810. For example, in an embodiment, the search engine 812 receives a threshold value 820 indicative of a possible future approximate bandwidth grant. The optical network unit 802 determines an amount of bandwidth to request corresponding to a size of whole packets that can be sent from the queue that is nearest to but not greater than the threshold value 820. The optical network unit is configured to use the search engine 812 to identify a second particular entry in the array data structure 808 that has a value nearest to but not greater than the gate size plus the threshold value 820 as a report entry. The transmission engine 816 is configured to transmit a report 822 based on the identified report entry in the array data structure 808.

Figure 9:
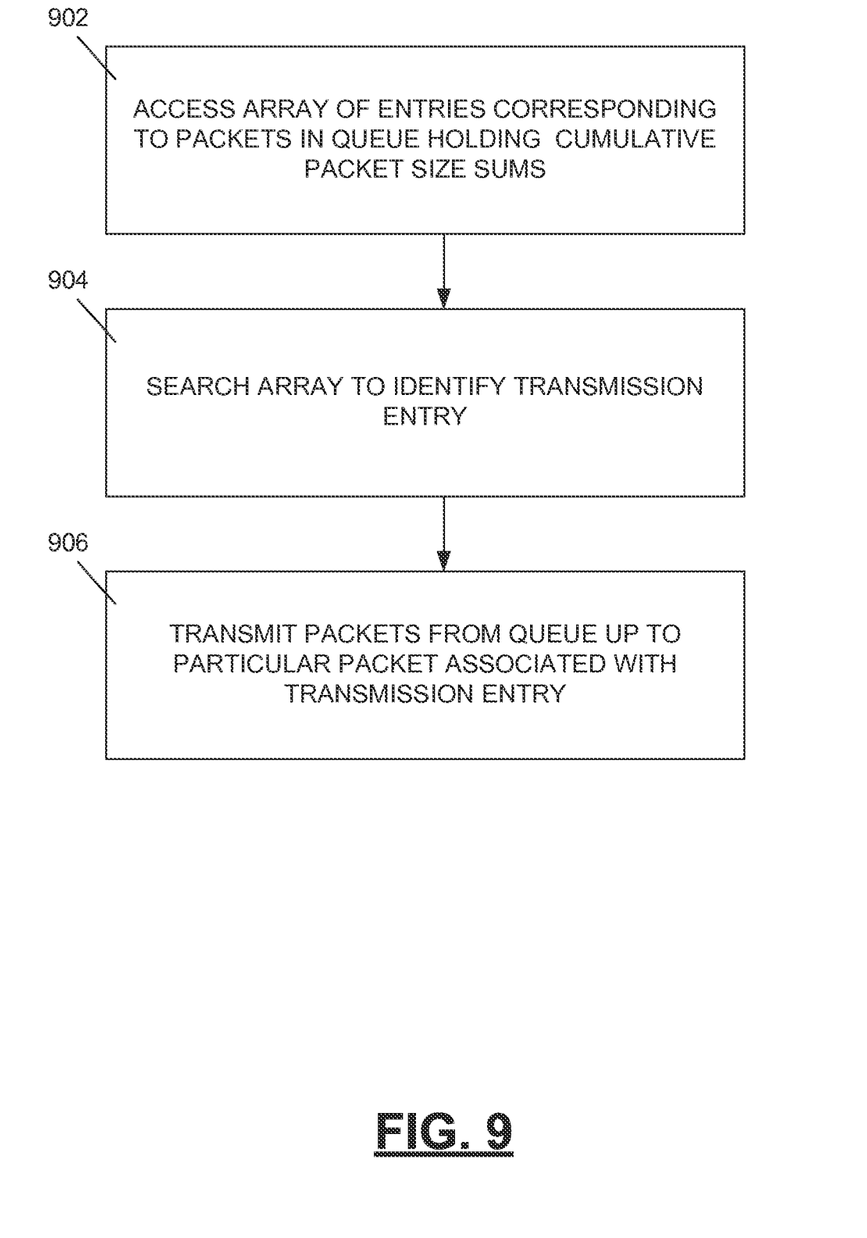
FIG. 9 is a flow diagram depicting a computer-implemented method of transmitting data based on a received gate size in an embodiment of the disclosure.

FIG. 9 is a flow diagram depicting a computer-implemented method of transmitting data based on a received gate size in an embodiment of the disclosure. At 902, an array data structure is accessed that is populated by a plurality of entries, where each entry corresponds to a packet in a queue of packets to be transmitted, where the entries are ordered according to an order of the packets in the queue, and where a particular entry includes a value that is based on a sum of packet sizes stored in a neighboring entry and a packet size of a packet corresponding to the particular entry. At 904, the array data structure is searched to identify a transmission entry having a value nearest to but not greater than the gate size. At 906, packets are transmitted from the queue up to a particular packet associated with the transmission entry.

This application uses examples to illustrate the invention. The patentable scope of the invention may include other examples.

What is claimed is:

1. A computer-implemented method of transmitting data based on a received gate size, comprising:
   accessing an array data structure that is populated by a plurality of entries, wherein each entry corresponds to a packet in a queue of packets to be transmitted, wherein the entries are ordered according to an order of the packets in the queue, and wherein a particular entry includes a value that is based on a sum of packet sizes stored in a neighboring entry and a packet size of a packet corresponding to the particular entry;
   searching the array data structure to identify a transmission entry having a value nearest to but not greater than the gate size; and
   transmitting packets from the queue up to a particular packet associated with the transmission entry.

2. The method of claim 1, further comprising:
   receiving a threshold value;
   identifying a report entry having a value nearest but not greater than the transmission entry plus the threshold value; and
   transmitting a report based on the report entry.

3. The method of claim 1, wherein each entry is based on a sum of packet lengths of packets associated with preceding entries in the array data structure plus a packet size of a packet corresponding to that entry.

4. The method of claim 2, further comprising:
   performing a multi-key binary search, wherein a first stage of the multi-key binary search identifies which of two halves of the array data structure each of the transmission entry and the report entry reside.

5. The method of claim 1, wherein a first entry of the array data structure identifies a packet size of a first packet in the queue, wherein a second entry of the array data structure identifies a sum of the first entry and a packet size of a second packet in the queue, and wherein a third entry of the array data structure identifies a sum of the second entry and a packet size of a third packet in the queue.

6. The method of claim 2, further comprising:
   performing a multi-key binary search on the array data structure, wherein the performing of the multi-key binary search includes searching for values associated with both the gate size and the threshold value in a single cycle.

7. The method of claim 6, further comprising:
   performing a first stage of the multi-key binary search that identifies which of two halves of the array data structure each of the transmission entry and the report entry reside.

8. The method of claim 7, further comprising:
   performing additional stages of the multi-key binary search to associate the gate size and the threshold value with individual segments of the array data structure, wherein when the gate size is associated with a first segment and the threshold value is associated with a different, second segment, the transmission entry is identified using a single-key binary search based on the gate size and the first segment and the report entry is identified using the single-key binary search based on the threshold value and the second segment.

9. The method of claim 2, further comprising:
receiving the gate size as part of a gate communication, wherein the gate communication further includes a gate start time, and wherein the transmission entry and the report entry are located in the array data structure and the report is generated based on the transmission entry and the report entry in a time period between receipt of the gate communication and the gate start time.

10. The method of claim 1, wherein the packets are transmitted from the front of the queue, wherein a cumulative size of the transmitted packets is less than or equal to the gate size, and wherein transmitting a packet after the particular packet associated with the transmission entry in the queue would result in a transmission of cumulative size of bits or bytes that is greater than bits or bytes of the gate size.

11. The method of claim 2, wherein the report identifies a request length, and wherein the request length is equal to the report entry minus the transmission entry.

12. The method of claim 11, wherein the request length identifies a specific bandwidth request for a subsequent gate.

13. The method of claim 2, further comprising:
receiving multiple threshold values; and
identifying a single report entry for each of the threshold values.

14. The method of claim 1, wherein the queue is based on a plurality of sub-queues, and wherein each sub-queue is associated with an application or process of a computer.

15. The method of claim 1, wherein the packets are transmitted from the queue according to an Ethernet Passive Optical Network (ETON) standard.

16. The method of claim 1, wherein the particular entry is configured to overflow when the sum of packet sizes stored in the neighboring entry and the packet size of the corresponding packet is greater than a maximum value, the method further comprising:
detecting when the particular entry is an overflow entry; and
making an adjusted comparison when the particular entry is detected to be an overflow entry.

17. The method of claim 1, wherein the array data structure is a circular array data structure that includes a first element and a last element, wherein the last element includes a pointer to the first element.

* * * * *